United States Patent [19]

Nishino et al.

[11] 4,449,173

[45] May 15, 1984

[54] MULTI-OUTPUT-TYPE POWER SUPPLY DEVICES USING SEPARATELY-EXCITING-TYPE SWITCHING REGULATORS

[75] Inventors: Hisao Nishino; Shigeru Kondo, both of Sendai, Japan

[73] Assignee: Tohoku Metal Industries, Inc., Sendai, Japan

[21] Appl. No.: 363,484

[22] Filed: Mar. 30, 1982

[30] Foreign Application Priority Data

Mar. 31, 1981 [JP] Japan .................................. 56-46337

[51] Int. Cl.³ ....................... H02M 3/335; G05F 1/64
[52] U.S. Cl. ......................................... 363/21; 363/97; 323/267; 323/272
[58] Field of Search .................................... 363/20–21, 363/24–26, 65, 71, 86, 97; 323/266, 267, 272

[56] References Cited

U.S. PATENT DOCUMENTS 3,546,611 12/1970 Dague ..................................... 363/65
3,573,600 4/1971 Carlisle ................................ 363/71

OTHER PUBLICATIONS

Hundley, II, "Current Limiting by Conduction Angle Control", IBM Technical Disclosure Bulletin, vol. 22, No. 2, Jul. 1979, pp. 505–507.

*Primary Examiner*—Peter S. Wong
*Attorney, Agent, or Firm*—Frishauf, Holtz, Goodman & Woodward

[57] ABSTRACT

A multi-output-type stabilized DC power supply device using separately-exciting switching regulators which includes a single pulse generator. The output of the single pulse generator drives a DC-AC inverter and a plurality of pulse signals are obtained on a plurality of secondary windings of the DC-AC inverter. The pulse signals are distributed to respective pulse-width modulators of the switching regulators and are modulated thereat by respective error signals. The DC power of each pulse-width modulator is obtained by rectifying the pulse signal applied thereto.

3 Claims, 4 Drawing Figures

MULTI-OUTPUT-TYPE POWER SUPPLY DEVICES USING SEPARATELY-EXCITING-TYPE SWITCHING REGULATORS

BACKGROUND OF THE INVENTION

This invention relates to DC power supply devices, and in particular, to multi-output-type power supply devices using separately-exciting-type switching regulators.

Although switching regulators are known to be excellent in efficiency, compactness and requiring only low power supply devices, they are high in cost. Therefore, in a known multi-output-type DC power supply device used in a digital circuit device, the switching regulator is used merely for a certain output in view of the fact that the voltage variation of only one of the outputs, such as the output of 5 V., is required to be within ±1% but voltages of the other outputs, such as outputs of ±12 V. and ±24 V., are not required to be so high in stability.

In arranging a multi-output-type DC power supply device wherein the high stability of voltages of all outputs is required, which is desired for use in electronic copying machines and other devices, a plurality of switching regulators must be provided to stabilize respective output voltages. However, it is disadvantageous from the view point of cost and simplicity of the device that a plurality of similar circuits, such as a pulse oscillator or a pulse generator and a power circuit for the oscillator and a pulse-width modulation circuit for forming the switching regulator, are provided in the device.

SUMMARY OF THE INVENTION

It is an object of this invention to provide a multi-output-type DC power supply device wherein voltages of all of the DC outputs are highly stabilized without problems of increased ripple and noise.

It is another object of this invention to provide a multi-output-type DC power supply device which is simple in construction and low in cost.

It is still another object of this invention to provide a multi-output-type DC power supply device wherein separately-exciting switching regulators are used for voltage regulation and commonly use a single pulse generator.

A stabilized DC power supply device having a plurality of switching regulators for generating a plurality of different DC powers with regulated voltage levels from a DC power source according to this invention comprises a single pulse generator means to which a DC power is fed from said DC power source for generating a pulse signal with a predetermined repetition frequency. Switching transistor means is connected to the output of the pulse generator means and turned on and off by the output pulse from the pulse generator means. A pulse transformer having a primary winding and a plurality of secondary windings is connected to said DC power source at its primary winding through said switching transistor means, and the plurality of secondary windings are coupled respectively with the plurality of switching regulators so that the plurality of switching regulators are excited in synchronization with one another by pulse signals from the single pulse generator means.

Rectifier means are provided to rectify the output pulse signals on each secondary winding of the pulse transformer. Each of the plurality of switching regulators has a pulse-width modulator circuit for pulse-width modulating the pulse signal from the pulse transformer, and the output of each rectifier means is fed to the pulse-width modulator circuit as its power source.

In an aspect of this invention, a stabilized DC power supply device for providing a plurality of DC powers with regulated voltage levels comprises a DC power source, and a plurality of DC-DC converter circuits each including a first switching transistor and for generating the plurality of DC powers with predetermined voltage levels from the DC power source. Means is provided for detecting error from the predetermined voltage level on the output of each one of the DC-DC converter circuits. A single pulse generator means to which a DC power is fed from the DC power source is provided for generating a pulse signal with a predetermined repetition frequency. Second switching transistor means is connected to the output of the pulse generator means and turned on and off by the output pulse signal from the single pulse generator means. A pulse transformer having a primary winding and a plurality of secondary windings is connected to the DC power source at its primary winding through the second switching transistor means. A plurality of pulse-width modulator circuits are connected to respective secondary windings of the pulse transformer and to respective error detecting means so that the pulse signals on respective secondary windings of said pulse transformer are pulse-width modulated by the error signals from respective error detecting means. The output of each pulse-width modulator circuit is coupled with the corresponding one of the DC-DC converter circuits to control the on-off operation of the first switching transistor thereof, whereby the voltage of the output of each DC-DC converter circuit is regulated.

Rectifier means are provided for rectifying the pulse signals on respective secondary windings of the pulse transformer, and the output of each rectifier means is fed to the corresponding one of the pulse-width modulator circuits as its power source.

According to another aspect of this invention, a stabilized DC power supply device for providing a plurality of DC powers with regulated voltage levels comprises a DC power source, a DC-AC inverter including a first switching transistor and an inverter transformer having at least two secondary windings on which AC powers of predetermined voltages are obtained, and at least two rectifier circuits connected respectively to said at least two secondary windings of the inverter transformer to provide at least two DC outputs of predetermined voltage levels. First means is provided for detecting errors from the predetermined voltage level on the output of a first one of the rectifier circuits. A single pulse generator means to which a DC power is fed from the DC power source is provided for generating a pulse signal with a predetermined repetition frequency. Second switching transistor means is connected to the output of the pulse generator means and turned on and off by the output pulse signal from the single pulse generator means. A pulse transformer having a primary winding and at least two secondary windings is connected to said DC power source at its primary winding through the second switching transistor means. A first pulse-width modulator circuit is connected to a first one of the secondary windings of the pulse transformer and to the first error detecting means so that the pulse signal on the first one of the secondary windings of the pulse transformer is pulse-width modulated by the error signal from the first error detecting means. The output of the first pulse-width modulator circuit controls the on-off operation of the first switching transistor whereby the voltage of the output of the first one of the rectifier circuits is regulated. A switching regulator circuit including a series controlling switching transistor is connected to the output of the other one of the at least two rectifier circuits. The pulse signals on the second one of the secondary windings is coupled with the switching regulator circuit to control on-off operation of the series controlling switching transistor.

A rectifying circuit is provided for rectifying the pulse signal on the first one of the secondary windings of the pulse transformer. The output of the rectifying circuit is fed to the first pulse-width modulator circuit as its DC power source.

Further objects, features and aspects of this invention will be easily understood from the following detailed description of preferred embodiments with reference to the accompanying drawings.

DETAILED DESCRIPTION OF PREFERRED EMBODIMENTS

Prior to description of embodiments of this invention, two known multi-output type DC power supply devices will be described referring to FIGS. 1 and 2.

Figure 1:
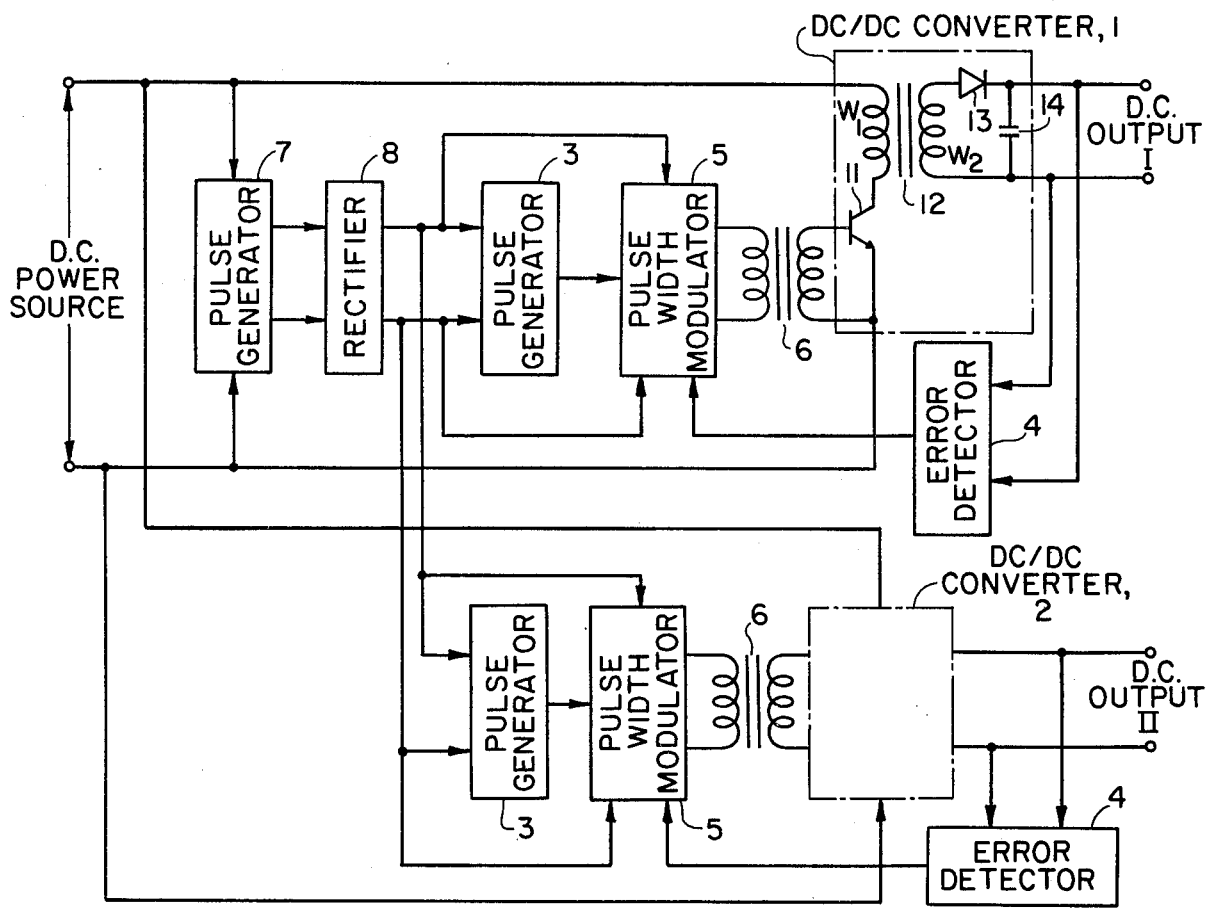
FIG. 1 is a view of a circuit diagram of a known multi-output-type stabilized DC power supply device.

FIG. 1 shows a known DC power supply device which generates two outputs of stabilized voltages from a DC power source. The device includes two DC-DC converters 1 and 2 for generating two DC outputs I and II of predetermined voltages from the DC power source. DC-DC converter 1 includes a switching transistor 11 and an inverter transformer or a pulse transformer 12 for generating an AC voltage of a predetermined value. The primary winding $W_1$ of inverter transformer 12 and switching transistor 11 are connected in series with the DC power source. Switching transistor 11 is turned on and off by application of pulses to the base of switching transistor 11. Therefore, DC current intermittently flows through the primary winding $W_1$ so that an AC voltage is induced on the secondary winding $W_2$ of inverter transformer 12 with a voltage level determined by a ratio of winding numbers of the primary and the secondary windings $W_1$ and $W_2$. The AC voltage is rectified comprised by a rectifier of, for example, a diode 13 and a capacitor 14, and a DC output of a predetermined voltage is thus obtained from the rectifier.

The other DC-DC converter 2 also includes a similar circuit arrangement, which is not shown in the drawing for purpose of simplicity.

In order to regulate the DC-output voltages, switching regulators are provided to control the on-off operation of switching transistor 11.

Each switching regulator includes a pulse generator or an oscillator 3, an error detector 4 and a pulse-width modulator circuit 5. The pulse signal from pulse generator 3 is pulse-width modulated at pulse-width modulator circuit 5 by the error signal from error detector 4. Error detector 4 is a circuit for comparing the DC output voltage of DC-DC converter 1 or 2 with a reference voltage to generate a signal corresponding to a difference between them.

The output from pulse-width modulator circuit 5 is applied to switching transistor 11 through a pulse transformer 6 to control the on-off operation of switching transistor 11. Therefore, the DC output voltage of DC-DC converter 1 or 2 is regulated.

In order to supply DC power to pulse generator 3 and pulse-width modulator 5, an internal power supply circuit including a pulse generator 7 and a rectifier 8 is provided to the device. The DC output from rectifier 8 is fed to pulse generators 3 and two pulse-width modulator circuit 5.

In the known arrangement, pulse generators 3 and must be provided by the number corresponding to the number of the DC-DC converters, so that the power supply device is complicated in construction and high in cost. Since it is difficult for all pulse generators 3 to oscillate at an equal pulse repetition frequency, pulse signals oscillated at different repetition frequencies interfere with one another so that the device suffers from increased ripple and uncomfortable noise. Moreover, the DC output I cannot completely be isolated from the other DC output II.

Furthermore, if the number of DC-DC converters is increased in accordance with the requirement of the increased number of DC outputs, the number of switching regulators is also increased. In that case, the internal DC power circuit including pulse generator 7 and rectifier 8 must be additionally provided because capacity of the single internal DC power circuit is comparatively small. This results in complication of construction and high cost of the device.

Figure 2:
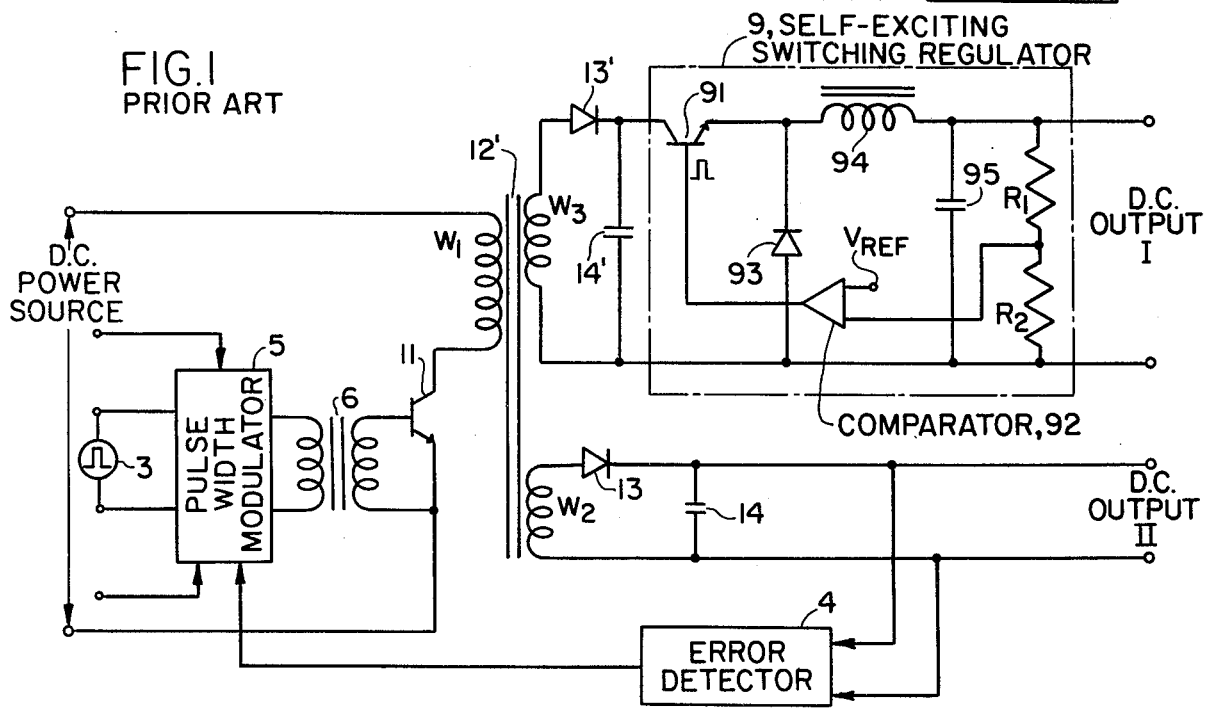
FIG. 2 is a view of a circuit diagram of another known multi-output-type stabilized DC power supply device.

Referring to FIG. 2, another known DC power supply device shown includes a switching regulator to regulate the voltage of the DC output I. The switching regulator is similar to that of FIG. 1 and includes a pulse generator 3, an error detector 4 and a pulse-width modulator circuit 5. However, the other DC output is obtained from another secondary winding $W_3$ of an inverter transformer 12' through a rectifier formed by a diode 13' and a capacitor 14'. A self-exciting switching regulator 9 is connected between the rectifier and the DC output terminal to regulate the voltage of the DC output II. Self-exciting switching regulator 9 comprises a series switching transistor 91. The voltage of the DC output II is taken out by a voltage divider of resistors $R_1$ and $R_2$, and is compared with a reference voltage $V_{REF}$ at a comparator 92 to obtain an error signal. The error signal is applied to the base of switching transistor 91 to control the on-off operation of switching transistor 91. Accordingly, the voltage of the DC output II is regulated. Reference numerals 93, 94 and 95 represent a free wheeling diode, an inductor and a capacitor, respectively.

In the arrangement, the cost of the device is reduced in comparison with the device of FIG. 1. However, the pulse repetition frequency is self-exiting switching regulator 9 is different from that in pulse generator 3 so that disadvantages such as increased ripple and noise cannot be improved.

In order to resolve those problems afflicting the known DC power supply devices of a plurality of DC outputs, this invention attempts to feed a pulse signal from a single pulse generator to all of separately-exciting switching regulators by driving a DC-AC inverter by the pulse signal of the single pulse generator and by obtaining a plurality of pulse signals on a plurality of secondary windings of an inverter transformer of the DC-AC inverter.

Figure 3:
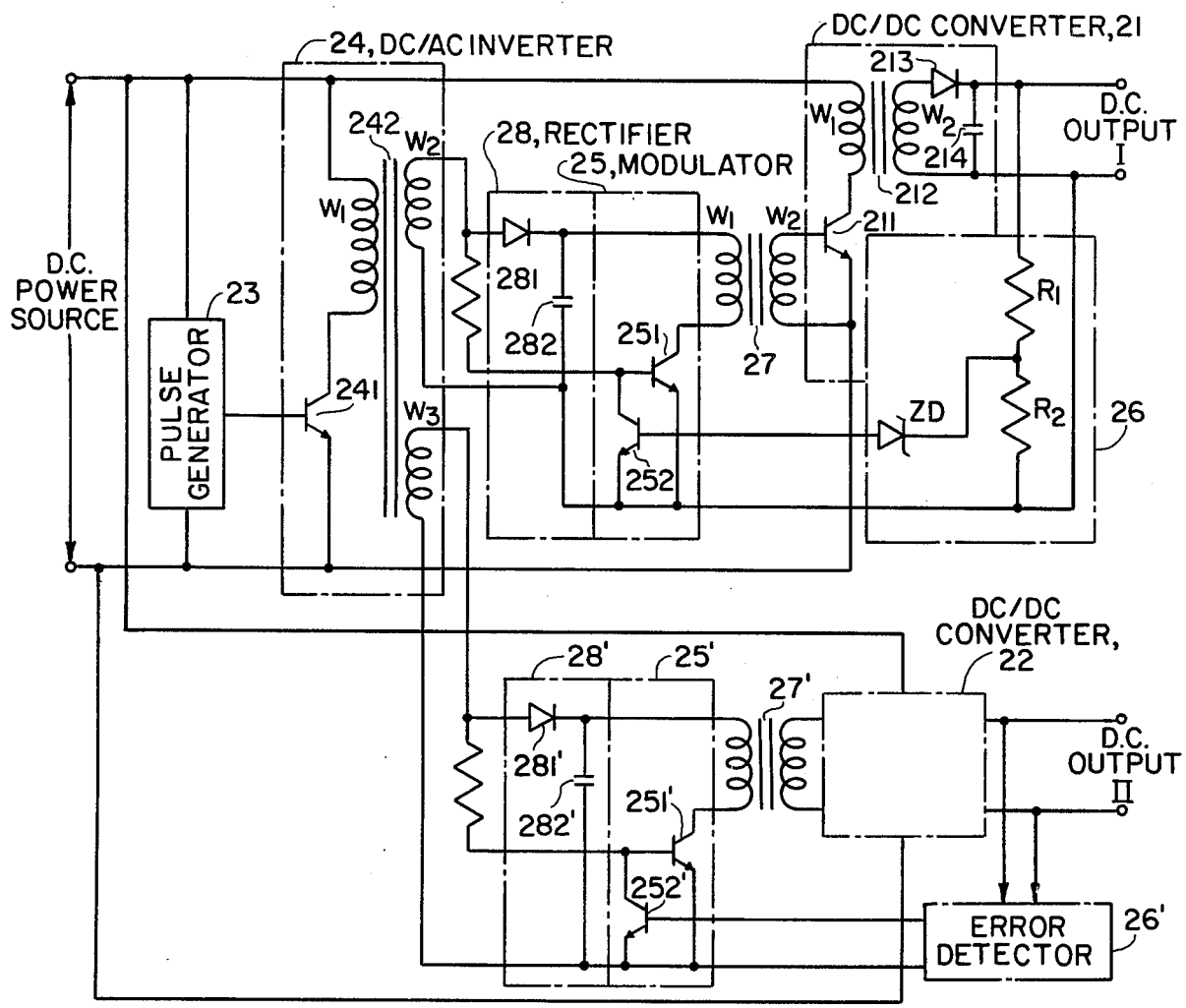
FIG. 3 is a view of a circuit diagram of an embodiment of this invention.

Referring to FIG. 3, an embodiment shown therein includes a plurality of, for example, two DC-DC converters 21 and 22 for generating two DC outputs I and II of predetermined voltages from the DC power source, similar to the device of FIG. 1. Similar to the DC-DC converter 1 in FIG. 1, DC-DC converter 21 also includes a switching transistor 211 and an inverter transformer or a pulse transformer 212 for generating an AC voltage of a predetermined value. The primary winding $W_1$ of inverter transformer 212 and switching transistor 211 are connected in series to the DC power source. Switching transistor 211 is turned on and off by application of pulses to the base of switching transistor 211. AC voltage induced on the secondary winding $W_2$ of inverter transformer 212 is rectified comprised by a rectifier of, for example, a diode 213 and a capacitor 214, and a DC output of a predetermined voltage is thus obtained from the rectifier.

The other DC-DC converter 22 also includes a similar circuit arrangement, which is not shown in the drawing for purpose of simplicity.

In order to regulate the DC-output voltages, switching regulators are provided to control the on-off operation of the switching transistors 211 of DC-DC converters 21 and 22.

All of the switching regulators commonly use a single pulse generator or an oscillator 23 through a DC-AC inverter 24. Pulse generator 23, to which a DC power is fed from the DC power source, generates a pulse signal which controls the on-off operation of a switching transistor 241 of DC-AC inverter 24. Switching transistor 241 is connected to the DC power source through a primary winding $W_1$ of an inverter transformer 242. Inverter transformer 242 has a plurality of secondary windings $W_2$ and $W_3$ on which pulse signals are induced. The pulse signal on secondary winding $W_1$ is applied to a pulse-width modulator circuit 25 of the switching regulator for the DC output I, and the pulse signal on the other secondary winding $W_2$ is applied to a pulse-width modulator circuit 25' of the switching regulator for the DC output II.

In order to detect variation of voltages of DC outputs I and II, error detectors 26 and 26' are connected to outputs of DC-DC converters 21 and 22, respectively, similar to the device of FIG. 1.

Each error detector 26 and 26' comprises, for example, a voltage divider of resistors $R_1$ and $R_2$ and a zener diode ZD as shown in the block of designated error detector 26. Other various detectors can be used as the error detector 26 or 26'.

Error signals from error detectors 26 and 26' are applied to pulse-width modulator circuits 25 and 25', respectively, to pulse-width modulate the pulse signals from DC-AC inverter 24.

Signals pulse-width modulated at respective modulators 25 and 25' are applied to switching transistors 211 of DC-DC converters 21 and 22 through pulse transformers 27 and 27', respectively, so that voltages of the DC outputs I and II are regulated independently from one another.

DC power of each pulse-width modulator circuit 25 is obtained by rectifying the pulse signal applied from DC-AC inverter 24 to each modulator 24 and 25', that is, secondary windings $W_1$ and $W_2$ of inverter transformer 242 are respectively connected to rectifier circuits 28 and 28', each of which comprises a diode 281 and 281' and a capacitor 282 and 282', and outputs of rectifier circuits 28 and 28' are fed to respective pulse-width modulator circuits 25 and 25'.

Pulse-width modulator circuits 25 comprise, for example, a switching transistor 251 and a transistor 252. Switching transistor 251 is connected to the output of rectifier circuit 28 through a primary winding $W_1$ of pulse transformer 27 and the secondary winding $W_1$ of inverter transformer 242 is connected between the base and the emitter of the transistor 251. Transistor 252 is also connected between base and emitter of switching transistor 251 and the error signal from error detector 26 is applied to the base of the transistor 252. Therefore, although the on-off operation of switching transistor 251 is controlled by the pulse signal induced on secondary winding $W_1$ of inverter transformer 242, the pulse-width of pulse signal present on primary winding $W_1$ of pulse transformer 27 is modulated because the impedance between the collector and the emitter of the transistor 252 changes in response to the error signal. The modulated pulse signal is induced on secondary winding $W_2$ of pulse transformer 27 and is applied to switching transistor 211 of DC-DC converter 21.

The other pulse-width modulation circuit 25' is also arranged similarly to the circuit 25, as shown in FIG. 3. Similar switching transistor 251 and transistor 252 are represented by reference numerals 251' and 252'.

In the arrangement as described above, a single pulse generator is commonly used by a plurality of switching regulators and DC power for each switching regulator is obtained by rectifying the pulse signal distributed from the pulse generator to respective switching regulators. Therefore, the construction of the device is simplified and the cost is reduced in comparison with known devices. Further, since pulse signals of different repetition frequencies are not used in the device, disadvantages such as increased ripple and noise due to interference between them are removed.

Figure 4:
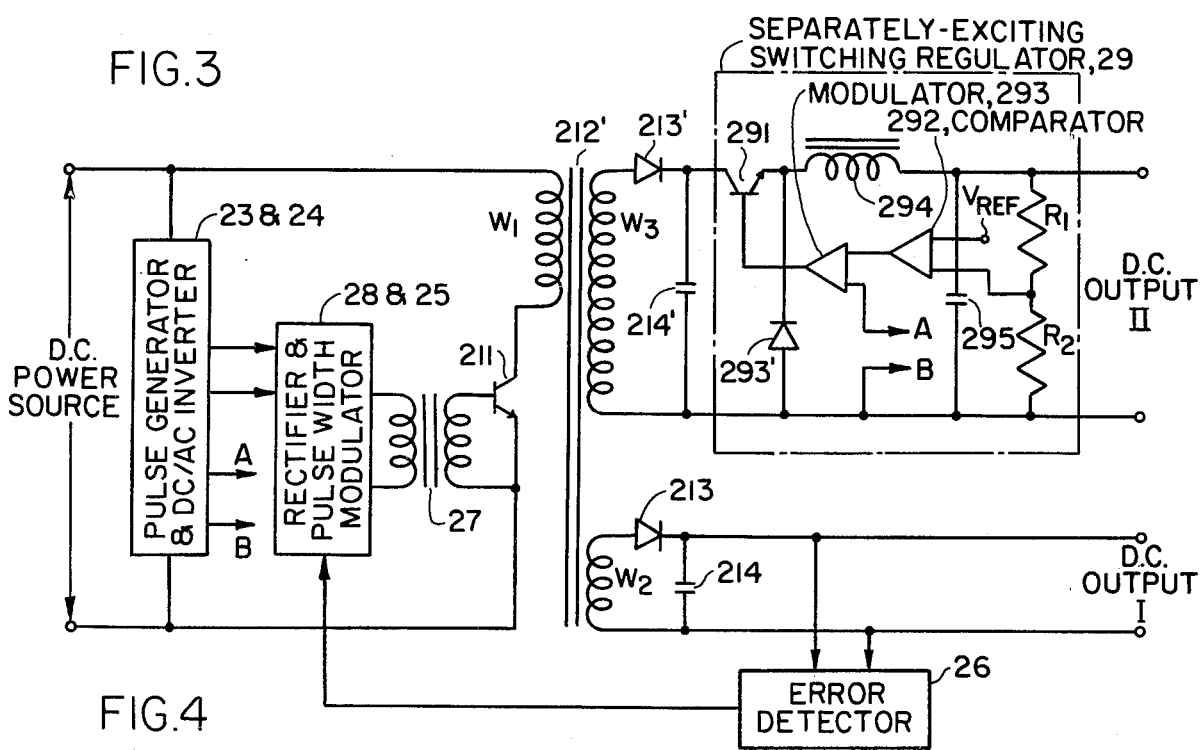
FIG. 4 is a view of a circuit diagram of another embodiment of this invention.

Referring to FIG. 4, the embodiment shown therein is similar to the embodiment of FIG. 3 except the circuit arrangement for obtaining the DC output II. Similar parts are represented by the same reference characters as those in FIG. 3. However, for purpose of simplicity, pulse generator 23 and DC-AC inverter 24 are shown by a single block, and rectifier circuit 28 and pulse-width modulator circuit 25 are also shown by a single block.

The DC output II is obtained from a secondary winding $W_3$ which is additionally wound on a pulse transformer 212' for obtaining the output I. A rectifier circuit comprising a diode 213' and a capacitor 214' is connected to the secondary winding $W_3$, and a separately-exciting switching regulator 29 is connected between the rectifier circuit and the DC output terminal to regulate the voltage of the DC output II.

Separately-exciting switching regulator 29 comprises a series-control-type switching transistor 291, a voltage divider of resistors $R_1$ and $R_2$, a voltage comparator 292 for detecting the error signal and a pulse-width modulator 293. The pulse signal to be pulse-width modulated is also distributed from DC-AC inverter 24 to pulse-width modulator circuit 293.

Variation of the voltage of the DC output II is detected at comparator 293 by comparing the voltage divided by voltage divider $R_1$-$R_2$ with a reference voltage $V_{REF}$. The detected error signal is applied to modulator 293 to pulse-width modulate the pulse signal from DC-AC inverter 24. The modulated pulse is applied to base of switching transistor 291 to control its on-off operation. Therefore, the voltage of the DC output II is regulated. The regulator 29 also includes a free wheeling diode 293, an inductor 294 and a capacitor 295.

DC power for the modulator 293 is also obtained by rectifying the pulse signal applied thereto by a rectifier circuit similar to that of FIG. 3.

In the arrangement, since two switching regulators use pulse signals of an equal repetition frequency, the disadvantages such as increased ripple and noise are removed in comparison with the known device of FIG. 2.

This invention has been described in detail in connection with preferred embodiments, but those are examples only and this invention is not restricted thereto. It will be easily understood by those skilled in the art that the other variations and modifications can be easily made within the scope of this invention.

What is claimed is:

1. In a stabilized DC power supply device having a plurality of switching regulators for generating a plurality of different DC powers with regulated voltage levels from a DC power source, the improvement which comprises:
    a single pulse generator means to which DC power is fed from said DC power source for generating a pulse signal with a predetermined repetition frequency;
    switching transistor means coupled to said single pulse generator means and being turned on and off by the output pulse from said single pulse generator means;
    a pulse transformer having a primary winding and a plurality of secondary windings, said primary winding being coupled to said DC power source through said switching transistor means, said plurality of secondary windings being coupled respectively with said plurality of switching regulators whereby said plurality of switching regulators are excited in synchronization with one another by pulse signals from said single pulse generator means; and
    a plurality of rectifier means coupled with said plurality of secondary windings, respectively, to rectify the output pulse signals on said respective secondary windings, each one of said plurality of rectifier means being coupled with a corresponding one of said plurality of switching regulators to provide a DC output thereto as its drive power source.

2. The stabilized DC power supply device as claimed in claim 1, wherein each of said plurality of switching regulators has a pulse-width modulator circuit for pulse-width modulating the pulse signals from said pulse transformer, and the output of said plurality of rectifier means is fed to said pulse-width modulator circuit as its drive power source.

3. A stabilized DC power supply device for providing a plurality of DC powers with regulated voltage levels, which comprises:
    a DC power source;
    a plurality of DC-DC converter circuits coupled to said DC power source, each of said DC-DC converter circuits including a first switching transistor, and said DC-DC converter circuits generating at the outputs thereof said plurality of DC powers with predetermined voltage levels;
    error detecting means for detecting an error from the predetermined voltage level on the output of each one of said DC-DC converter circuits;
    a single pulse generator means to which a DC power is fed from said DC power source for generating an output pulse signal with a predetermined repetition frequency;
    second switching transistor means coupled to the output of said single pulse generator means and being turned on and off by the output pulse signal from said single pulse generator means;
    a pulse transformer having a primary winding and a plurality of secondary windings, said primary winding being coupled to said DC power source through said second switching transistor means;
    a plurality of pulse-width modulator circuits coupled to respective secondary windings of said pulse transformer and to respective error detecting means so that pulse signals on respective secondary windings of said pulse transformer are pulse-width modulated by the error signals from respective error detecting means, the output of each pulse-width modulator circuit being coupled with the corresponding one of said DC-DC converter circuits to control the on-off operation of said first switching transistor thereof whereby the voltage at the output of each DC-DC converter circuit is regulated; and
    a plurality of rectifier means coupled with said plurality of secondary windings, respectively, to rectify the output pulse signals on said respective secondary windings, each one of said plurality of rectifier means being coupled with a corresponding one of said plurality of pulse-width modulator circuits to provide a DC output thereto as its drive power source.

* * * * *